Aug. 17, 1943.   T. VAN TUYL ET AL   2,326,808
VEHICLE BRAKE SIGNALS
Filed Oct. 2, 1939   5 Sheets-Sheet 4

Aug. 17, 1943.                T. VAN TUYL ET AL                2,326,808
                            VEHICLE BRAKE SIGNALS
                             Filed Oct. 2, 1939                5 Sheets-Sheet 5

Patented Aug. 17, 1943

2,326,808

UNITED STATES PATENT OFFICE 2,326,808

VEHICLE BRAKE SIGNAL

Thomas Van Tuyl and Charles B. Hale,
Chicago, Ill.

Application October 2, 1939, Serial No. 297,524

3 Claims. (Cl. 177—311)

The object of the present invention is to produce a simple, novel and reliable means for apprizing others near by of the fact when the brakes of an automobile or other vehicle are being suddenly applied.

In carrying out my invention, a signalling device, which is preferably an alarm, is controlled by some movable part of the brake apparatus which receives a sharp impact when an emergency application of the brakes is made; and the invention may therefore, in one of its aspects, be said to have for its object to produce a simple and novel controlling device for a brake signal which operates when such moving part receives a sharp blow or is subjected to a sudden impact, but remains inoperative during movements of such part in normal or ordinary brake application.

It is desirable, also, to warn the driver of a vehicle when the brakes become defective. A further object of the present invention is to combine with the aforesaid signal means to warn the driver that the brakes need attention.

The various features of novelty whereby the present invention is characterized will hereinafter be pointed out with particularity in the claims; but, for a full understanding of the invention and of its objects and advantages, reference may be had to the following detailed description taken in connection with the accompanying drawings, wherein:

Referring to Figs. 1 to 8 of the drawings, 1 represents the usual or any suitable brake pedal of an automobile and 2 the usual or any suitable steering post positioned near the brake pedal; both extending through the more or less upright portion 3 of the floor of an automobile. Carried by a suitable bracket 4 clamped upon the pedal in front of or underneath the floor, in a manner to be hereinafter described, is a small casing or housing 5 shown as being divided lengthwise into two parts or sections as plainly seen in Fig. 4. Each section of the the casing has a downwardly projecting ear, indicated at 6 and 7, respectively; these ears lying flatwise against each other, and there being a screw 8 passing through the same and into the bracket 4. The screw 8 need not, however, serve as the means to hold the two sections of the casing together, since screws, such as indicated at 9 and 10 in Fig. 4, may be provided for that purpose.

Figures 1, 1A, 2, 3:
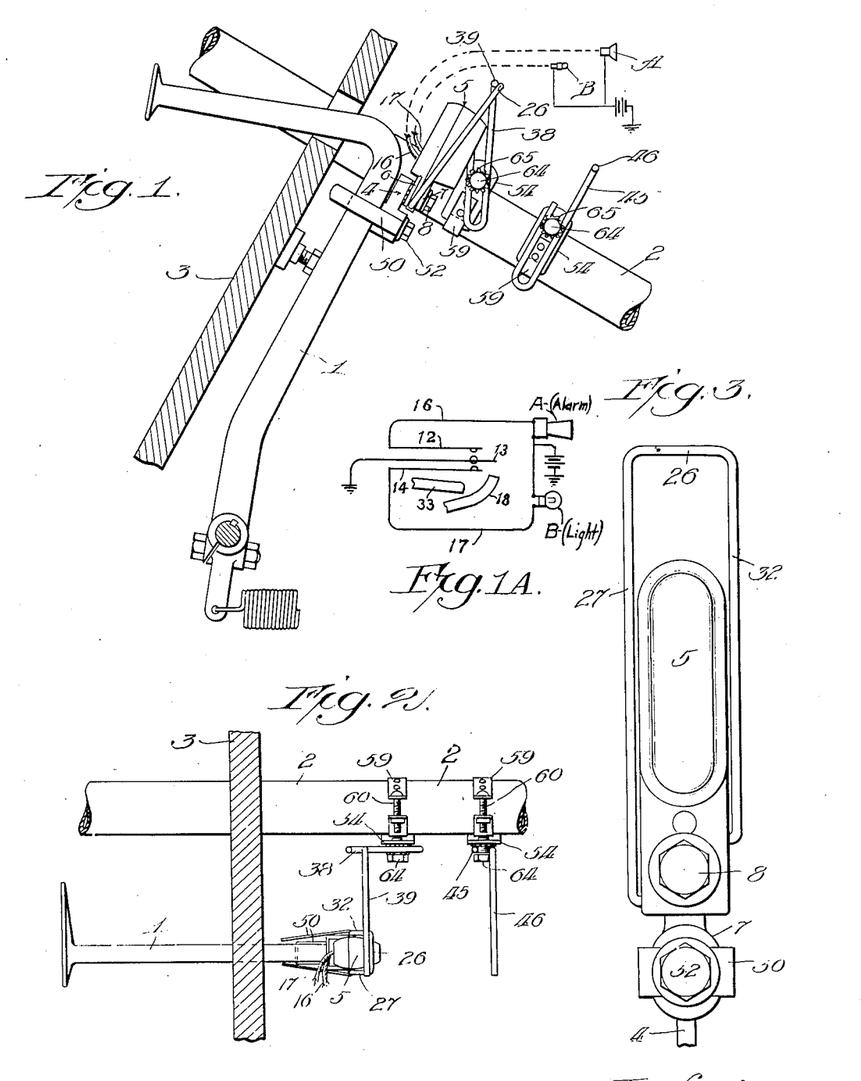
Figure 1 is a side view of an automobile brake pedal and a fragment of the steering post, having mounted thereon one form of the new signal-controlling devices, and there being a fragment of the vehicle floor shown in section.
Fig. 1A is a diagram illustrating the signal and alarm circuit.
Fig. 2 is a top plan view of the parts shown in Fig. 1, the floor being shown in section.
Fig. 3 is a front view of the controller shown in Figs. 1 and 2, but on a much larger scale.

Within one section of the casing are shown three contact pieces 12, 13 and 14 arranged parallel, in spaced relation and insulated from each other and from the casing. Conveniently these contact pieces or fingers are fixed to the casing at corresponding ends, so that their other ends stand free. It will be seen that the middle finger 13 is longer than the other two, its free end projecting considerably beyond the free ends of the latter. The long intermediate contact finger has a ground connection to the casing, as indicated at 15 in Fig. 4. The contact finger 12 is connected to a wire 16 which, as indicated in the diagrammatic addition to Fig. 1, leads to one terminal of a signal or alarm whose other terminal is, in turn, connected to one terminal of a battery or other source of electrical energy; the other terminal of the source of energy being permanently grounded. In the arrangement shown, this signal or alarm is indicated as being the usual automobile horn A. The third finger 14 is connected to a wire 17 which, as shown in Fig. 1, leads to one terminal of a small electric lamp B which may be mounted on the dash where it can easily be seen by the driver. The wire 17 is connected to the source of electrical energy in parallel with the wire 16. Therefore, when the free end of the finger 13 is forced into contact with the finger 12, the horn will be sounded; whereas, when the free end of the finger 14 is pressed against the finger 13, the lamp B will be lighted.

The closing of the horn switch is primarily accomplished through the action of a snap-action trigger mounted within the second section of the casing in such a manner that, after it has been set, a quick kick against the pedal will throw it into action to cause the horn circuit to be closed; whereas, when the pedal is depressed in the usual way, as distinguished from an emergency act, the trigger remains in its set condition. In the arrangement shown, the trigger comprises a flat, heavy bar 18 almost as long as the interior of the casing, sharpened at its lower end as indicated 19, and having an S-shaped bend 20 about midway between its ends. The sharpened lower edge of the trigger rests in the valley of a small V-shaped plate 22 provided with the stem portion 23 by which it is held stationary in the lower end of the casing. Thus, the trigger may rock about its lower sharp edge from and toward the switch finger 13; the upper end of the trigger being curved rearwardly so that it may strike against the finger 13 and force it against the stationary finger 12 without disturbing the finger 14. In the upper part of the casing is a second plate 24 having a V-shaped portion similar to the part 22. A flat steel spring 25 is engaged at one end in the plate 24 and at its other end in one of the re-entrant portions of the S curve 20 in the trigger. The spring, when in position, is bowed and tends constantly to straighten. The parts are so proportioned that normally, when the trigger is in its set position, the spring tends to hold it away from the switch finger 13; but, if the trigger be swung a substantial distance toward the switch, it is carried past center and the spring then serves to drive it forcibly against the projecting end of the finger 13, as indicated in Fig. 5.

It will be seen that the casing is so positioned that the trigger swings in the plane of movement of the brake pedal but, in order to close the switch for the horn, must swing or rock in the opposite direction from that in which the brake pedal moves in applying the brakes. Therefore, with the trigger set as in Fig. 4, a sharp kick against the pedal sets both the pedal and the casing in motion, but the inertia of the fairly massive trigger serves to delay a corresponding movement in the trigger. As a result, if the trigger be not too far off center, it will in effect be kicked past center and the spring will then cause it to complete its movement in the switch-closing direction. After the trigger has pressed the switch finger 13 against the finger 12, it remains in that position until it is reset. In order to reset the trigger, there is provided a compound lever formed of spring wire bent into the proper shape. As best shown in Fig. 7, this lever comprises a U-shaped part 26, somewhat longer than the casing; the free end of one leg 27 of the U being bent laterally and then upwardly, as indicated at 28 and 29, respectively. The part 28 fits into a transverse groove 30 in the face of the neck or stem element 6, while the part 29 fits into a groove 31 arranged at right angles to the groove 30. The second leg 32 of the lever is bent laterally and inwardly a short distance above the upper end of the part 29, and is then bent upwardly parallel with the other leg of the U, as indicated at 33, so as to form with the main portion of the leg 32 a second, narrower U, which stands upright. The free end of the inner leg 33 of the second U is bent laterally, as indicated at 34, toward the leg 32. The transverse or yoke portion 35 of this secondary U fits into a transverse groove 36 in the face of the element 6, while the part 33 extends through either of two longitudinal grooves 37 up into the interior of the casing. All of the grooves just described are preferably formed wholly in the element 6, so that the cooperating stem element 7 may have simply a flat face serving as a cover for the grooves.

Figures 4, 5, 6, 7, 8:
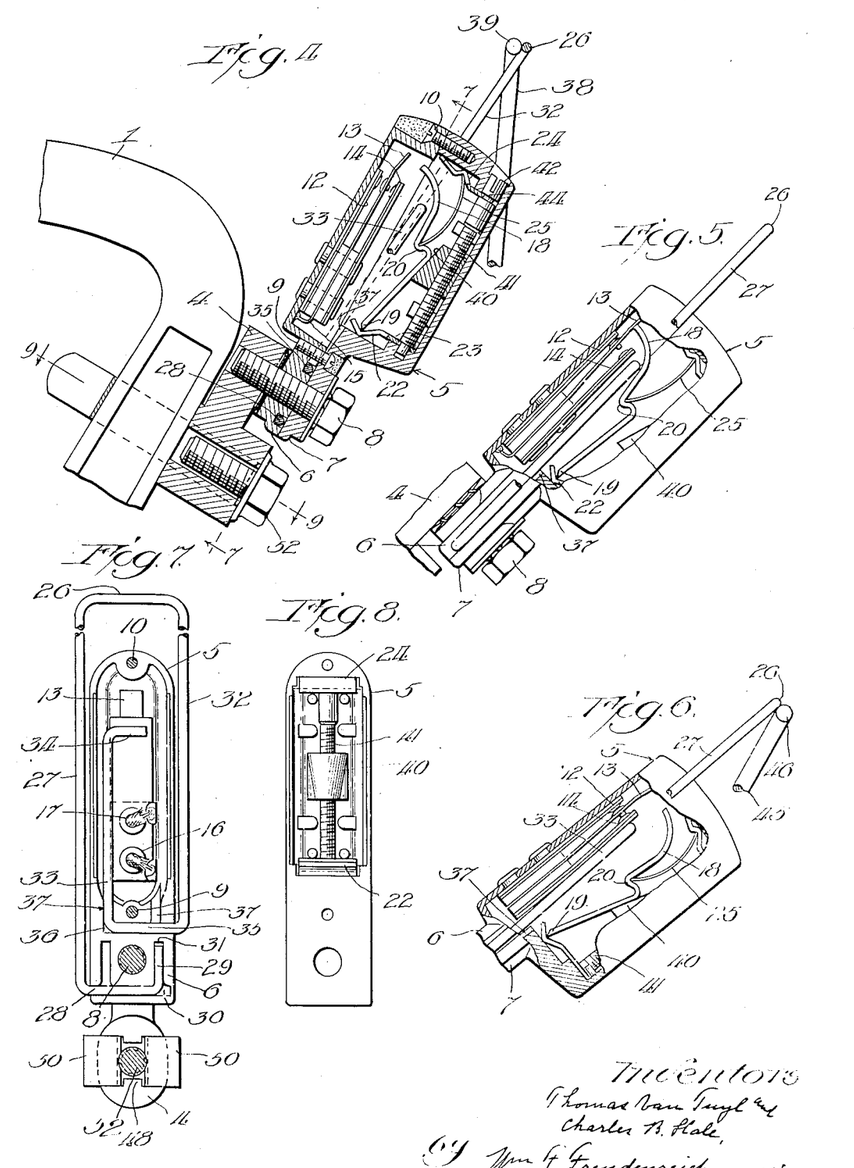
Fig. 4 is a vertical section, on a plane extending from front to rear, through the controller and its supporting clamp or bracket, on the same scale as Fig. 3 and showing the parts, including a fragment of the brake pedal, in the same positions as in Fig. 1.
Fig. 5 is a side view of the controller, a portion of the casing being broken away to expose the interior, and the parts of the controller in the positions which they occupy when an alarm is being sounded by reason of an emergency application of the brakes.
Fig. 6 is a view similar to Fig. 5, showing the parts of the controller in the positions which they occupy when, because of defective brakes, it is necessary to press the pedal far down.
Fig. 7 is a section on line 7—7 of Fig. 4, the wire actuator being shown in elevation.
Fig. 8 is a view of the controller casing or housing taken on line 7—7 of Fig. 4, but looking in the opposite direction from that in which the arrows are pointing.

After the wire lever has been assembled with the rear section of the casing, as indicated in Fig. 7, it is maintained in position by the other section of the casing when the two sections are united. It will be seen that the parts 28 and 29 of the lever fix the corresponding leg to the casing, so that any movement of the free end of the lever can take place only through a flexing of the wire. However, the grooves 37 are deep so that the part 33 of the secondary U may swing at right angles to the plane of the lever about the axis of the transverse part 35. Therefore, if the upper free end of the lever be pushed forwardly, the inner leg 33 will move through about the same angle. Consequently, since the lateral projection 34 on the leg 33 lies between the switch and the trigger and, in fact, quite close to the trigger when the latter is in switch-closing position as in Fig. 5, any stop in the path of the upper end of the lever, while the pedal is returning to its normal idle position, will cause the trigger to be reset. This is due to the fact that the trigger continues to travel rearwardly with the casing until it strikes against the part 34 on the stationary lever; thereby being forced forwardly relatively to the casing. Upon being pushed past dead center the resetting of the trigger is completed through the action of the spring 25, the trigger again assuming the position which it occupies in Figs. 4 and 6.

The stop for resetting the trigger may take any usual or suitable form. In the arrangement shown, there is a U-shaped member 38 composed of a heavy wire or a light rod, adjustably secured to the steering post and having an extension of one leg bent laterally as indicated at 39, (best seen in Fig. 2), behind and in the path of movement of the upper end of the trigger-setting lever. Therefore, whenever the brake pedal returns to its normal idle position, the free end of the lever 26 strikes the part 39 on the stationary stop device and causes a resetting of the trigger if it happens to be in its switch-closing position.

It is desirable that the sensitiveness of the trigger be adjustable to the needs of each particular brake apparatus and, also, that it be possible to adjust the setting from time to time, as conditions demand. To accomplish these aims, means are provided to limit the distance that the trigger travels past center in the setting thereof; the closer the trigger is to being at dead center, the more sensitive it will be and the smaller the blow or impact needed to make it operate. The stop illustrated consists of a nut in the form of a wedge-shaped block 40 resting against the front wall of the casing and held in position by a long screw 41 that extends throughout the entire length of the casing and has as its upper end a slotted head 42 by means of which it may be turned. The screw is held against movement, except a rotary movement about its axis. Lateral movements in any direction are prevented by the bearing surfaces which surround the two ends of the screw. Lengthwise movements of the screw may be prevented by providing the screw with an annular groove 44 just underneath the head, and utilizing the plate 24 as a key portions of which enter this groove. It will be seen that the inclined face of the block 40 and the lower half of the trigger are parallel to each other at the time that the trigger engages the block. Therefore, if the screw be turned in one direction, it will permit the spring 25 to shift the upper part of the trigger farther to the right as viewed in Fig. 4 whereas, if the screw is turned in the other direction, the block is shifted in a direction that causes the trigger to be carried closer to dead center.

It will thus be seen that the sole purpose of the trigger is to sound an alarm when an emergency application of the brakes is made, for it has no effect on the switch finger 14. In order to cause the switch 14 to close the lamp circuit, there is provided on the steering post a second stop device 45 similar to the one previously described; this stop device being placed well forward so that its stop element 46 is not engaged by the lever 26 unless the foot pedal is pressed so far down that there must be something wrong with the brakes. Whenever the foot pedal moves down far enough, the lever strikes the stationary stop element 46 as shown in Fig. 6, causing the leg 33 of the lever and its lateral projection 34 to press the contact finger 14 rearwardly and engage it with the finger 13, thus closing the circuit of the warning lamp. Also, by properly proportioning the parts, both of the fingers 13 and 14 may be driven back until the finger 13 engages with the finger 12 and causes the horn to blow, in addition to energizing the lamp. It will be seen that the calibration of the device may be such that the horn will not be sounded whenever the brakes are applied, even though the brakes need servicing; only the lamp circuit being closed when the condition of the brakes is not very bad, and thus warning the driver that if he does not get his brakes fixed the horn will begin to sound whenever he presses down on the brake pedal.

Figures 9, 10, 11, 12, 13, 14, 15:
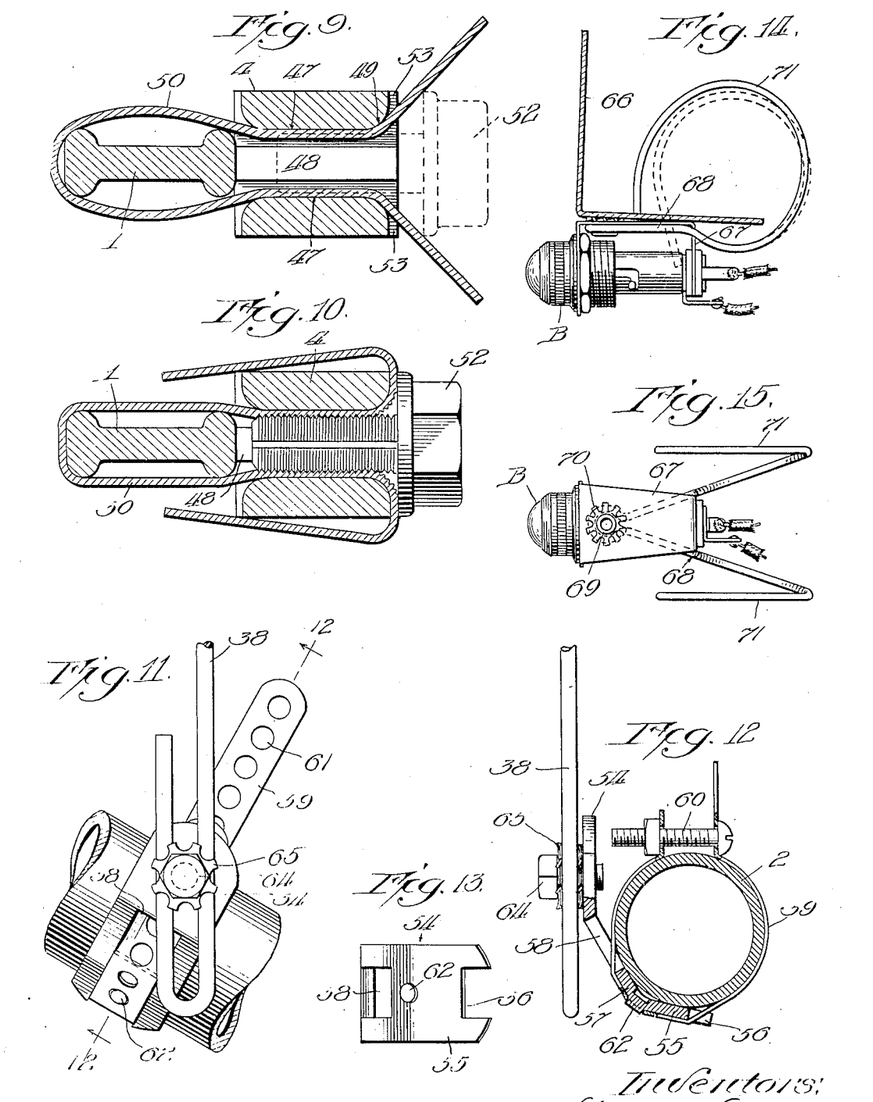
Fig. 9 is a section on a larger scale, taken approximately on line 9—9 of Fig. 4, showing the device for clamping the controller to the brake pedal as it appears before the clamping screw has been tightened, the screw being indicated in dotted lines in an intermediate position.
Fig. 10 is a view similar to Fig. 9 showing the clamp tightened upon the pedal.
Fig. 11 is a side view of a fragment of the steering post and one of the stop devices for the signal apparatus, together with the means for supporting the stop device on the steering post.
Fig. 12 is a section taken approximately on line 12—12 of Fig. 11, the stop device and the adjacent part of its supporting bracket being shown in elevation.
Fig. 13 is an elevational view of the bracket appearing in Figs. 11 and 12.
Fig. 14 is a section through the dash of an automobile, showing in elevation a signal lamp and a device for clamping it to the dash.
Fig. 15 is a top plan view of the parts shown in Fig. 14, with the exception of the dash.

In Figs. 9 and 10 there is illustrated a novel means for clamping the bracket 4 to the pedal. It will be seen that the bracket contains a hole extending through the same from front to rear and having opposed flat, parallel sides 47. The other sides of the hole may be of any desired shapes although they are also shown as being flat and as having wide, low central ridges 48 extending throughout the length thereof. Each of the flat walls 47 merges at its ends into curved sections 49 that give a flaring effect to the two ends of the hole. Extending through the hole in the bracket is a metal strap 50 which is first looped about the pedal, from the rear, and the ends of which are then inserted in the hole in the bracket; each end portion lying flat against one of the flat faces 47. After this assembly has been made, the strap may be drawn taut and the parts that project forwardly from the bracket may be bent laterally as indicated in Fig. 9. A thread cutting screw 52, of the proper size, namely, of a diameter about equal to the distance between the ridges 48 and somewhat less than the distance between the strap sections located in the hole, is then partially entered from the front between the strap ends. Upon turning the screw, it cuts a thread in each strap end and gradually draws the strap tightly about the pedal, by reason of the fact that the two strap ends are drawn forwardly by the screw as long as there is any slack to be taken up. In order to prevent the head of the screw from clamping the strap ends between it and the front face of the bracket, grooves 53 are cut across the front face of the bracket in registration with and for a height equal to the vertical dimension of the flat sides 47 of the hole in the bracket; the depth of these grooves being at least as great as the thickness of the strap material. Consequently, the head of the screw does not press against the protruding strap but simply serves as a guide that permits the strap ends to creep laterally and rearwardly until the condition illustrated in Fig. 10 results.

In Figs. 11 to 13 there is illustrated a simple device for supporting either of the stationary stops 38 and 45. This device comprises a bracket in the form of a stiff plate 54 having therein two sharp bends in the same direction. The parts are so proportioned that when the bracket is set against the steering post with the latter resting in the angle between one end section 55 and the central section of the bracket, the other end section may be brought into a plane parallel with the plane of movement of the pedal. The end section 55 has in the free end a wide notch 56, while the central section, 57, contains a wide window 58. A strap 59 is threaded through this window and carried along the outer face of the bracket to and through the notch 56; the two ends of the strap being carried around the steering post from opposite sides, and being joined together by a bolt 60. In this way the bracket is tied tightly to the steering post. As shown, the strap has bolt-receiving holes 61 distributed along the same. The bracket may be provided at the corner between the sections 55 and 57 with an outwardly projecting boss 62 adapted to enter one of the bolt holes in the strap to prevent slippage between the strap and the bracket. The corresponding stationary stop is secured to the bracket by means of a short, headed screw 64 extending between the legs of the U-shaped portion thereof and into the bracket. Between the U-shaped part and the bracket on the one side and the screw head on the other, are placed washers 65 of the toothed, gripping type which bite into the surfaces between which they are clamped and thus prevent relative turning movements of the assembled parts.

In Figs. 14 and 15 is shown a means for detachably mounting the lamp B on the dash 66 of an automobile. The lamp socket is fixedly held in a U-shaped bracket or yoke 67, the cross member of which is approximately parallel to the axis of the lamp. A V-shaped wire clip 68 has the apex section thereof underlying the cross member of the bracket and secured thereto by a hollow rivet 69 which preferably passes through a toothed washer 70. The protruding wire ends are bent upwardly into ring shaped loops 71 whose common axis is parallel with the plane of the cross member of the bracket 67. In other words, when the lamp is placed underneath the dash so that the cross member of the bracket is horizontal, the loops 71 are vertical and their free ends lie at considerable distances from the bracket. While not truly so, the loops may roughly be described as being helical. At any rate, the loops lie mainly above the plane of the flat portion of the V with the extreme ends, when free to do so, extending somewhat below this plane as shown in dotted lines in Fig. 14. Therefore, when the lamp is slid underneath the horizontal flange of the dash from the right as viewed in Fig. 16, the free ends of the wires must be lifted so as to carry them on top of the flange where they will exert a downward pressure which, accompanied by the biting action of the washer 70, serves to hold the lamp securely against displacement.

Figures 16, 17, 18:
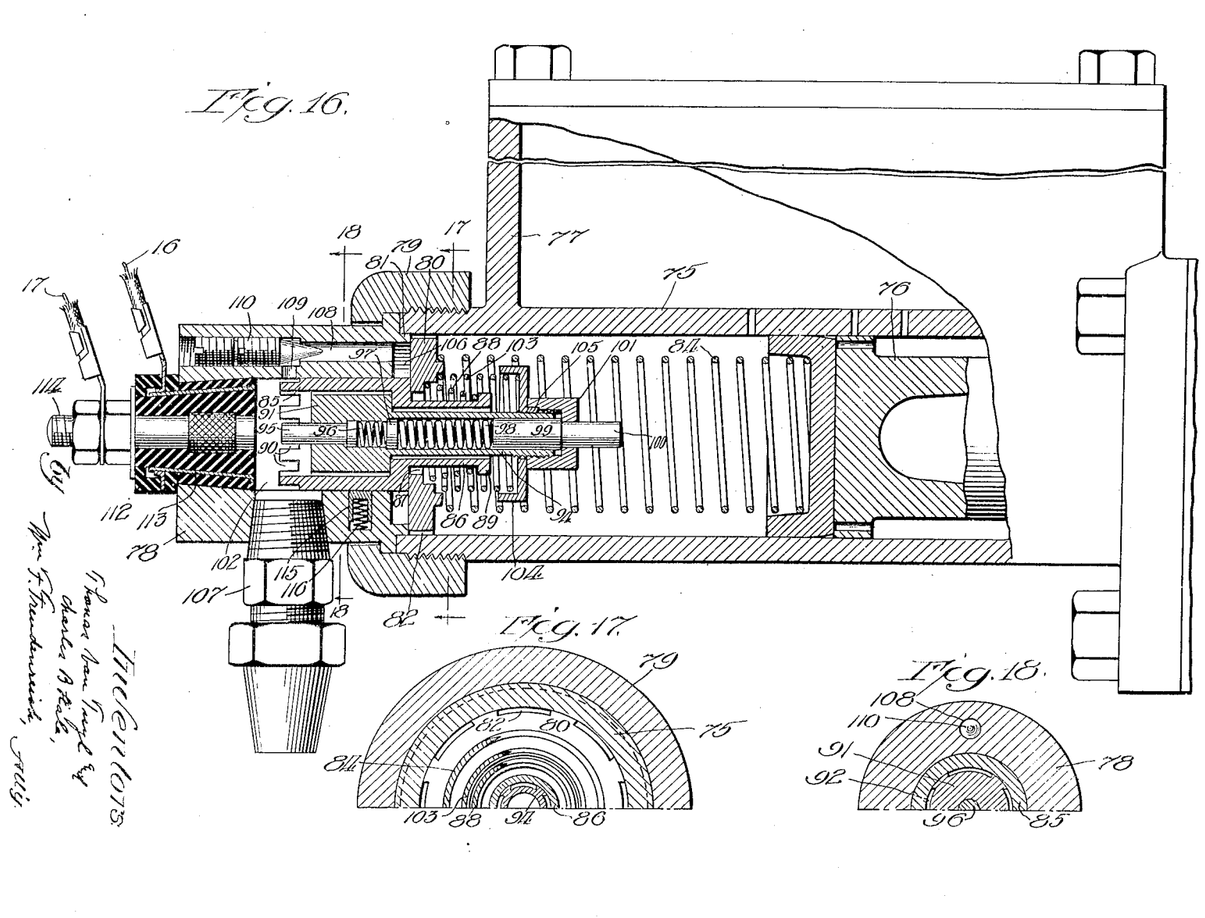
Fig. 16 is a view of the master cylinder and liquid reservoir of a hydraulic brake system, partly in elevation and partly in section, illustrating the manner in which the signal controlling means may be incorporated in that structure.
Fig. 17 is a section taken on line 17—17 of Fig. 16, only the upper half of the cylinder being shown.
Fig. 18 is a section on line 18—18 of Fig. 16, showing only the same upper half of the structure that appears in Fig. 17.

In Figs. 16 to 18 there is illustrated a form of the present invention incorporated in the master cylinder unit of a hydraulic brake system. Referring to these figures, 75 represents any usual or suitable master cylinder, 76 the piston therein, and 77 a reservoir for brake fluid; the piston being adapted to be moved toward the left in Fig. 16, by the operation of the usual pedal, not shown. The cylinder has at one end a head 78 held in place by a sleeve-like nut 79. Arranged within the cylinder is a large disk valve 80 which normally rests against an annular lip or flange 81 on the inner end of the head and fitting into the cylinder. The valve 80 has peripheral notches 82 through which fluid may pass when the valve is unseated. A long, light compression spring 84 extends between the piston and the valve to hold the latter yieldingly against its seat, while permitting it to be unseated when brake fluid is required to return from the system into the cylinder.

The head 78 is in the form of a thick-walled cylindrical sleeve and, slidable in the same, is a cup-shaped primary pressure valve 85 whose closed end normally bears against the forward face of the return valve 80. The valve 85 has a rearwardly extending tubular stem 86 open at its rear end and opening at its front end into the chamber within the valve. This stem extends through an opening 87, of greater diameter than the stem, in the center of the return valve. Surrounding the stem, behind the return valve, is a spring 88 which bears at its front end against the valve and at its rear end against a flange or collar 89 on the rear end of the stem. This spring normally holds the primary pressure valve seated against the return valve and closing that part of the central opening in the latter that surrounds the stem 86. The valve 85 has deep notches 90 cut into the same through the front edge of its cylindrical wall and it is of reduced external diameter in the notched region, thereby providing an annular space between the front end of the valve and the surrounding wall of the cylinder head.

Slidably fitted in the body of the valve 85 is a secondary pressure valve 91 in the form of a cylindrical block having wide, shallow peripheral grooves 92 distributed about the same and extending throughout the length thereof. The valve 91 has a tubular stem 94, smaller in external diameter than the internal diameter of the stem 86, extending through and projecting beyond the rear end of the latter. The member 91 has an axial bore, the rear section of which is somewhat smaller in diameter than the interior of the stem 94, while the front section is still smaller in diameter. Arranged in the front section of the bore in member 91 is a plunger 95 provided with a head situated in the forward end of the rear section of the bore and serving as a stop to limit the forward movement of the plunger. Behind the plunger is a light compression spring 96 that normally holds the head of the plunger seated against the shoulder formed at the juncture of the two sections of the bore in the valve. Within the stem 94 is a loose disk 97 against which the rear end of the spring 96 bears and which serves as an abutment for a strong compression spring 98 disposed within the stem. In the stem 94, behind the spring 98, is a plunger 99 which has a part 100 of reduced diameter extending through a cap 101 screwed upon the rear end of the stem. The valve 91 is normally held seated against the face that forms the bottom of the cup in valve 85, by a spring 103 which bears at its front end against the valve 80 and at its rear end against a washer or follower 104 surrounding the stem 94 in front of and in engagement with the nut 101. The washer is slidable on the stem but is inter-locked with the same and with the nut, by a key in the shape of a tongue 105 projecting rearwardly from the washer; the latter thus acting as a nut lock.

It will be seen that the presence of the flange 81 on the rear end of the cylinder head 78 creates a shallow chamber 106 lying between the rear end of the head proper and the return valve 80, into which passage fluid may flow from the master cylinder when the valve 85 is pushed forward, away from the return valve. For the fluid then to reach the outlet 107 connected to the chamber 102 in the head in front of the valve 85, a longitudinal passage 108 is provided in the cylindrical wall of the head. A port 109 opens from this passage into the chamber within the head in front of the valve 85. The forward end of the passage 108 is enlarged to provide a valve seat at the juncture thereof with the rear section, to the rear of the port 109. In the enlarged forward section of the passage is screwed a suitable valve 110 having a pointed end extending into the smaller rear section. By screwing this valve in or out the effective size of the passage through which fluid must flow to reach the port 109 may be decreased or increased, thereby making it possible to regulate the rate of flow for a given pressure on the fluid.

Normally the parts are in the position illustrated in Fig. 16. When the brake pedal is pressed in making an application of the brakes, the piston 76 moves forward, namely, to the left, forcing the fluid in the cylinder against the valve 85. The pressure of the fluid unseats this valve and permits fluid to flow through the central opening 87 in return valve 80, into chamber 106, and through port 109 and to outlet 107. The valve 85 need not open far to permit fluid to enter the passage 108 as fast as it can flow past the regulating valve 110. However, if an emergency application of the brakes is being made, the brake pedal being moved by impact rather than by a steady pressure, the fluid cannot escape through the passage 108 fast enough and the valve 85 is forced to the extreme forward limit of its movement, closing the port 109. The pressure of the liquid against valve 91 now forces that valve open, so that the braking fluid reaches the outlet by flowing through the interior of the valve 85, and out through the notches 90 in the latter.

In the event that there is a fault in the brake system that makes it necessary to push the pedal far down in order to obtain a braking effect, the piston 76 will strike the rear end of the plunger 99 and will push the valve 91 forward.

When the brake pedal is released after a braking stroke has been made, the brake fluid again flows back toward the master cylinder, forcing the valves 85 and 91 back until the return valve 80 is unseated. Thereupon brake fluid flows through the port 109, passage 108, chamber 106 and notches 82 in the periphery of the valve 80, into the master cylinder 75.

The abnormal valve movements just described are utilized to give the signals heretofore described. For this purpose the valve 85 and the plunger 95 serve as movable contact pieces adapted to cooperate with stationary contacts in a plug 112 of insulating material closing the front or outer end of the sleeve-like cylinder head. Embedded in and coaxial with this plug is a metal sleeve 113 having its rear end exposed in the chamber 102; the diameter of the said end of the sleeve being equal to the diameter of the valve 85. Consequently, when the valve 85 is driven forward far enough to close the port 109, it contacts the sleeve 113 to which the conductor 16 forming part of the horn circuit is connected. Fixed in and extending coaxially through the plug 112 is a rod 114 of conducting material, the rear end of which is contacted by the plunger 95 when the brake pedal is pressed down at a time when the condition of the brake system is such that a normal movement of the pedal does not suffice to apply the brakes. The conductor 17, forming part of the warning lamp circuit, is connected to the outer end of the rod 114.

The movable contacts are of course grounded through the master brake cylinder unit, just as the contact finger 13 in the other form of the invention is grounded. In order to insure a good electrically conductive path from the valve 85, forming one of the movable contacts, there is placed within a radial socket in the cylindrical wall of the cylinder head a cup-shaped contact shoe 115 behind which is a spring 116 that presses the shoe at all times against the outer surface of the valve.

In the arrangement shown in Figs. 19 to 22, the construction differs in detail from that of Figs. 16 to 18, inclusive, although being the same in principle. The cylinder head 120 in Figs. 19 to 22 is similar to the head 78, but is somewhat longer, and being more in the nature of a solid cylindrical block having large cylindrical bores extending longitudinally thereof and opening out through the front end. As there are three valve devices employed in this construction, there are three of the longitudinal bores indicated at 121, 122 and 123, respectively. The rear end of each of these bores terminates at the inner end at a flat transverse surface on an end wall 124, but communicates with the interior of the cylinder 75 through a port or a passage coaxial therewith, extending through said wall 124, as indicated at 125, 126 and 127, respectively. Screwed into the bore 121, from the outer end of the head, is a long thick-walled sleeve 128 provided near the rear or inner end with a peripheral groove 129 communicating with the interior of the sleeve through a series of ports 130. The bore in the sleeve is reduced in diameter at the rear end of the sleeve, beyond the ports 130, as indicated at 132. Screwed into the sleeve, so as to be accessible from the outside, is a needle valve 133 cooperating with the port or passage 132. In the bore 121, between the wall 124 and the rear end of the sleeve 128, is a sliding cylindrical block 134 which, when pressed rearwardly, serves as a valve to close the port or passage 125. The block is reduced in diameter at the extreme rear end and, in this part of reduced diameter, are a series of radial ports 135 communicating with an axial bore 136 extending into the block from the front end but stopping short of the rear end of the block. Arranged in the bore 136 is a compression spring 137 abutting at its forward end against the rear end of the sleeve 128 and thus normally serving to hold the block in position to close the port 125. The annular chamber comprising the groove 129 communicates with the bore 122 by means of a passage 138 in a region where the bore 122 is intercepted by a bore 139 extending up through the bottom of the head for the reception of the nipple portion of the outlet device 107.

Figure 19:
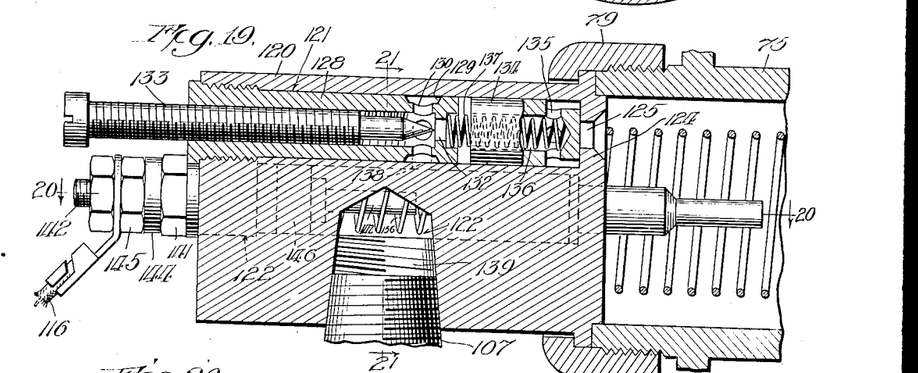
Fig. 19 is a central vertical longitudinal section through another type of head, and a fragment of the master cylinder, in a construction wherein the controlling devices are associated with the master cylinder.

Therefore, as long as the inlet from the passage 138 to the bore 122 is not closed, pressure on the pedal to apply the brakes will cause brake fluid to flow through the passage or port 125, pushing the block 134 toward the left, as viewed in Fig. 19; and the fluid will then flow through the radial ports 135, passage 136, port or passage 132 and ports 130 into the groove 129 and from there through the passage 138 to the distribution system through the outlet 107. The rate at which the braking fluid flows under a given pressure may be regulated by means of the needle valve 133; this valve being set so that the flow shall be sufficiently rapid to take care of ordinary brake applications.

Figure 20:
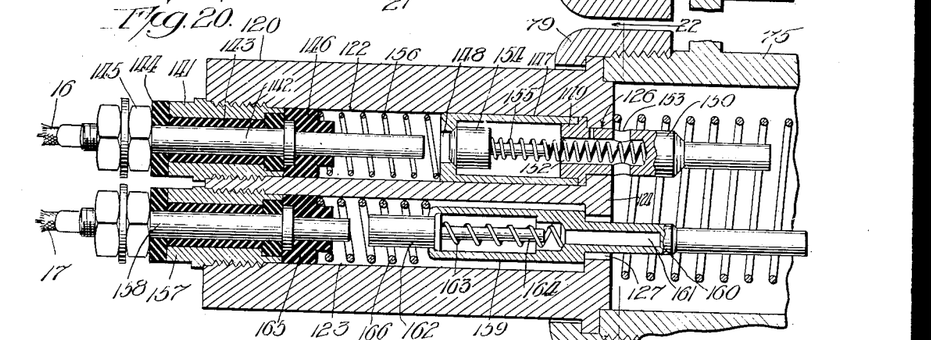
Fig. 20 is a section on line 20—20 of Fig. 19.
Figure 21:
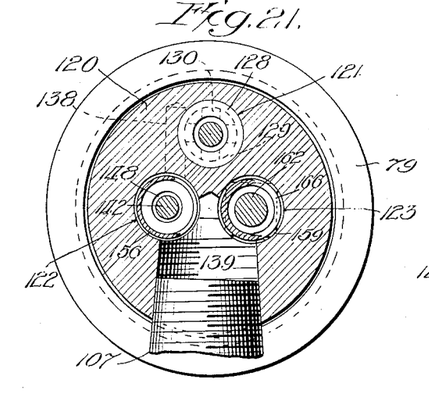
Figs. 21 and 22 are sections taken respectively on line 21—21 of Fig. 19 and line 22—22 of Fig. 20, looking in the direction of the arrows.
Figure 22:
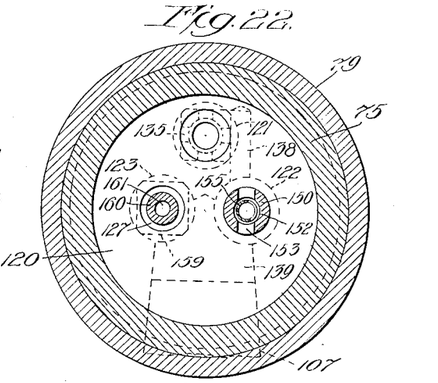

Associated with the bore 122 are devices which cause the horn to sound when an emergency application of the brakes is being made. Screwed into the outer end of the bore 122 is a plug 141 through which extends and into which is fixed a long rod-like contact member 142 the outer end of which is connected to the wire 16 forming part of the horn circuit. The rod 142 is insulated from the plug by means of a surrounding sleeve 143 of insulating material, and there is a washer 144 of insulating material placed between the nut 145 and the end of the plug. The inner end of the rod extends into the interior of the bore 122 so as to bring its rear end just below the passage 138, and it is surrounded by a block 146 of insulating material that fits into the bore 122 and abuts against the rear end of the plug. In the rear end of the bore 122 is a long cup-shaped part 147 having its closed end toward the front and containing in the closed end a central port 148. The open rear end of the cup is closed by a plug 149 provided with a stem 150 that is smaller in diameter than this plug but of the same diameter as the port 126 through which it extends and in which it is a slidable fit. A hole 152 is bored centrally through the plug 149 and far enough into the stem to extend behind the rear face of the cylinder head when the plug is seated against the front face of the wall 124. Radial holes 153 lead to the exterior of the stem from the central hole or bore at a point which is just behind the cylinder head when the plug 149 is in its rearmost position, as shown in Fig. 20. Within the chamber in the part 147 is a forwardly-seating check valve 154 cooperating with the port 148; this valve being normally held closed by means of a light compression spring 155 engaged with the rear face thereof and extending into and bottoming in the hole or bore 152. In the bore 122, in front of the part 147, is a compression spring 156 engaged at one end with the block 146 of insulating material and at its other end with the front face of the part 147.

Normally the spring 156 holds the part 147 in the position shown in Fig. 20, and the spring 155 holds the check valve closed. In the operation of the brakes the check valve permits the rate of the brake fluid to the master cylinder when the pressure on the pedal is removed; the fluid that is driven back from the distributing system into the chamber 139 entering the bore 122 in the space between the plug 141 and the part 147, and pushing back the check valve so as to be able to flow through the interior of the part 147, the bore 152 and the ports 153 into the master cylinder. In the event that an emergency application of the brakes is made, so that the brake fluid cannot move fast enough through the passage controlled by the needle valve, the pressure that is built up in the master cylinder forces the unit of which the part 147 and the stem 150 are elements toward the left, as shown in Fig. 20, causing the check valve 154 to strike against the rear end of the contact rod 142 and thus closing the circuit through the horn. This results in the shutting off of the passage 138 through which the brake fluid travels in ordinary operations of the brakes and makes it necessary to provide additional means for permitting the brake fluid to reach the distribution system. Such additional means are contained in the bore 123.

Into the front end of the bore 123 is screwed a plug 157 similar to the plug 141 and containing a rod 158 similar to the rod 142, but projecting less far beyond the rear end of the plug than does the rod 142. In the rear end of the bore 123 is a long block 159 having a flat rear face to serve as a valve to close the port 127 and having an external contour such that it is slidably held in the bore and yet provides ample passages between the outer surfaces thereof and the surrounding cylindrical wall to permit a free flow of brake fluid when occasion demands. In the arrangement shown, this block is approximately square in cross section, meaning thereby that its cross sectional shape was that of a square whose diagonals were somewhat longer than the diameter of the bore; the four corners of the block having been machined so as to form narrow sections of a cylinder of the same diameter as the bore 123. The block 159 is provided with a rearward extension 160 in the form of a stem-like element longer than the stem 150. The block 159 is hollow, and there is a bore or passage 161 extending from the chamber within the block rearwardly into the stem. Slidably within the block 159 is a cylindrical plug 162 which protrudes from the block and has its front end spaced a short distance from the rear end of the contact rod 158 when the block 159 is in its rearmost position, as shown in Fig. 20. Behind the part 162 is a spring 163 which normally holds it in its forward position. Extending through this spring is a long stem 164 projecting rearwardly from the part 162 and adapted to enter the bore 161 when the part 162 is pushed back into the block. Between a block of insulating material 165, surrounding the rearwardly-projecting end of the rod 158 and similar to the block 146 and the front end of the block 159 is a strong compression spring 166 that normally holds the block in position to close the port 127. In an emergency operation of the brakes, when other passages between the master cylinder and the distributing system are closed, the pressure in the master cylinder forces the member 159 toward the left, as viewed in Fig. 20, permitting brake fluid to flow through the port 127 past the member 159 and down into the chamber 139. The port 127 is considerably larger than the cross sectional area of the stem 160, and there is ample room for the fluid to travel past the member 159, so that the member 159 need not move far enough to cause the little plug or plunger 162 to engage the contact rod 158. Consequently, the lamp circuit, the wire 17 of which is connected to the rod 158, does not close during ordinary or emergency operations of the brake. However, if the brake system contains a leak, or one of the pipes should be broken, or, if for any other reason, an excessive movement of the piston in the master cylinder takes place upon depressing the pedal, the piston will strike the stem 160 and will force the member 159 far enough forward or to the left, as viewed in Fig. 20, to close the lamp circuit. It will also be seen that if the brake system is in a very bad condition, the piston in the master cylinder may travel far enough to engage with the stem 150 and drive it forward until the horn circuit is closed and the horn is caused to sound.

In the construction just described, as in the case of that disclosed in Figs. 16 to 18, the movable contacts 154 and 162 are grounded, so that each movable contact need only be engaged with its cooperating stationary contact to close the corresponding circuit.

We claim:

1. In combination, two signals, a casing adapted to be fixed upon a brake pedal, two two-position controlling devices, one for each signal, arranged in the casing, an inertia-operated actuator mounted in the casing to move from an idle position and drive one of said controlling devices into its working position when the pedal is driven down quickly, a member mounted on the casing and yieldingly held in an idle position, said member being movable in one direction from its idle position to move both controlling devices into their working positions and movable in the opposite direction from said idle position to reset the actuator, said member having a part lying on the exterior of the casing and adapted to engage an upper stationary stop to reset the actuator when the pedal rises and to engage a lower stationary stop to move it in the direction to shift both controlling devices into their working positions when the pedal moves down abnormally far as is the case when brakes are defective.

2. In combination, a casing adapted to be fixed upon a brake pedal, a two-gap switch within the casing, an inertia-operated actuator mounted in the casing to move from an idle position into engagement with a part of such switch and close one of said gaps when the pedal is driven down quickly, a member mounted on said casing and yieldingly held in an idle position, said member being movable in one direction from said idle position to engage a part of said switch and close both of said gaps and movable in the opposite direction from said idle position to reset said actuator, said member having a part lying on the exterior of said casing and adapted to engage an upper stationary stop to reset the actuator and to engage a lower stationary stop to close both gaps in said switch when the pedal moves down abnormally far due to defective brakes.

3. In combination, a casing adapted to be fixed upon a brake pedal, two signals, two switches, each controlling one of said signals, arranged within the casing, an inertia-operated actuator mounted in the casing to move from an idle position into engagement with the movable part of one of such switches to close the same when the pedal is driven down quickly, a member mounted on said casing and yieldingly held in an idle position, said member being movable in one direction from said idle position to engage the movable part of the other of said switches and close both of the switches and movable in the opposite direction from said idle position to reset said actuator, said member having a part lying on the exterior of said casing and adapted to engage an upper stationary stop to reset the actuator and to engage a lower stationary stop to close both switches when the pedal moves down abnormally far due to defective brakes.

THOMAS VAN TUYL.
CHARLES B. HALE.